(12) United States Patent
Williams et al.

(10) Patent No.: US 7,189,179 B2
(45) Date of Patent: Mar. 13, 2007

(54) ON-DEMAND TWO-SPEED TRANSFER CASE WITH SLIDING ANNULUS PLANETARY GEARSET

(75) Inventors: Randolph C. Williams, Weedsport, NY (US); Aaron Ronk, Lake George, NY (US); Stanislav Ponca, Liverpool, NY (US); Timothy R. Stalloch, Cicero, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 1303 days.

(21) Appl. No.: 10/012,618

(22) Filed: Oct. 30, 2001

(65) Prior Publication Data

US 2006/0281597 A1 Dec. 14, 2006

(51) Int. Cl.
*F16H 37/08* (2006.01)
(52) U.S. Cl. ...................... 475/204; 475/298
(58) Field of Classification Search ............... 475/198, 475/204, 298, 320
See application file for complete search history.

(56) References Cited

U.S. PATENT DOCUMENTS

| | | | |
|---|---|---|---|
| 4,770,280 A | 9/1988 | Frost | |
| 5,078,660 A | 1/1992 | Williams et al. | |
| 5,284,068 A | 2/1994 | Frost | |
| 5,323,871 A | 6/1994 | Wilson et al. | |
| 5,346,442 A | 9/1994 | Eastman | |
| 5,411,447 A | 5/1995 | Frost | |
| 5,582,263 A | 12/1996 | Varma et al. | |
| 5,651,749 A | 7/1997 | Wilson et al. | |
| 5,655,986 A | 8/1997 | Wilson et al. | |
| 5,697,861 A | 12/1997 | Wilson | |
| 5,700,222 A | 12/1997 | Bowen | |
| 5,702,321 A | 12/1997 | Bakowski et al. | |
| 5,704,867 A | 1/1998 | Bowen | |
| 5,836,847 A | 11/1998 | Pritchard | |
| 5,902,205 A | 5/1999 | Williams | |
| 5,947,858 A | 9/1999 | Williams | |
| 5,951,429 A | 9/1999 | Eastman | |
| 6,022,289 A | 2/2000 | Francis | |
| 6,056,666 A | 5/2000 | Williams | |
| 6,113,512 A | 9/2000 | Williams | |
| 6,152,848 A | 11/2000 | Williams et al. | |
| 6,283,887 B1 | 9/2001 | Brown et al. | |
| 6,514,167 B1 * | 2/2003 | Fleytman et al. ........... 475/201 |
| 6,579,204 B2 * | 6/2003 | Brown et al. ............... 475/204 |
| 6,579,205 B2 * | 6/2003 | Williams .................... 475/204 |

* cited by examiner

*Primary Examiner*—Ha Ho
(74) *Attorney, Agent, or Firm*—Harness, Dickey & Pierce, P.L.C.

(57) ABSTRACT

An on-demand two-speed transfer case is equipped with a planetary gearset and a range shift mechanism to provide high-range and low-range drive connections. The range shift mechanism is arranged to concurrently move two components of the planetary gearset and can be synchronized to permit on-the-move range shifts.

26 Claims, 6 Drawing Sheets

ON-DEMAND TWO-SPEED TRANSFER CASE WITH SLIDING ANNULUS PLANETARY GEARSET

FIELD OF THE INVENTION

The present invention relates generally to a power transfer system for controlling the distribution of drive torque between the front and rear drivelines of a four-wheel drive vehicle. More particularly, the present relates to an on-demand transfer case having a two-speed gear reduction unit, a range clutch for establishing high-range and low-range drive modes, and a mode clutch for controlling interaxle slip between the front and rear drivelines.

BACKGROUND OF THE INVENTION

Due to growing consumer demand for four-wheel drive vehicles, a plethora of different power transfer systems are currently utilized for directing power (i.e., drive torque) to all four wheels of the vehicle. For example, in many "part-time" power transfer systems, a transfer case is installed between the front and rear drivelines and is normally operable in a two-wheel drive mode for delivering drive torque to the driven wheels. However, when the four-wheel drive mode is desired, a mode shift mechanism is selectively actuated by the vehicle operator for directly coupling the non-driven wheels to the driven wheels for establishing a part-time or locked four-wheel drive mode. One example of a part-time transfer case is disclosed in commonly-owned U.S. Pat. No. 4,770,280.

A significant number of the transfer cases discussed above are equipped with a gear reduction unit and a range shift mechanism operable for permitting the vehicle operator to choose between high-range and low-range drive modes. In many instances, the vehicle must be stopped before the transfer case can be shifted between its high-range and low-range drive modes. Unfortunately, the need to stop the vehicle prior to shifting between the high-range and low-range drive modes is inconvenient, particularly upon encountering road conditions or surface terrains where continuation of the vehicle's rolling momentum would assist in overcoming the conditions encountered. To alleviate this inconvenience, some two-speed transfer cases are equipped with a synchronized range shift mechanism from permitting "on-the-move" shifting between the high and low ranges.

It is also known to use "on-demand" power transfer systems for automatically directing power to the non-driven wheels, without any input or action on the part of the vehicle operator, when traction is lost at the driven wheels. Typically, the on-demand feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque to the non-driven wheels. The amount of drive torque transferred through the clutch assembly can be varied as a function of specific vehicle dynamics detected by the sensor arrangement. One example of an on-demand power transfer system is disclosed in commonly-owned U.S. Pat. No. 5,323,871.

A need exists to develop two-speed on-demand transfer cases equipped with both non-synchronized and synchronized range shift mechanisms which advance the art and provide improved operational and/or structural characteristics over conventional transfer cases.

SUMMARY OF THE INVENTION

It is therefore an object of the present invention to provide a transfer case for an on-demand four-wheel drive vehicle having a sliding annulus-type planetary gear assembly which functions as a two-speed gear reduction unit.

As an additional object of the present invention, the two-speed transfer case includes a range shift mechanism which can be selectively actuated for establishing a high-range drive mode, a neutral mode, and a low-range drive mode.

According to another object of the present invention, the transfer case includes a biasing clutch which is operably associated with the output shafts for limiting speed differentiation and regulating the drive torque distribution therebetween in response to the occurrence of slip between the front and rear output shafts. To this end, a control system is provided which includes sensors for detecting and generating sensor signals indicative of various dynamic and operational characteristics of the vehicle, and a controller for controlling actuation of the biasing clutch in response to the sensor signals. Upon the occurrence of traction loss, the clutch is automatically actuated for limiting slip while transferring increased drive torque to the non-slipping driveline.

Additional objects come with features and advantages of the present invention will become apparent from studying the following detailed description and appended claims when taken in conjunction with accompanying drawings.

DETAILED DESCRIPTION OF THE PREFERRED EMBODIMENTS

Figure 1:
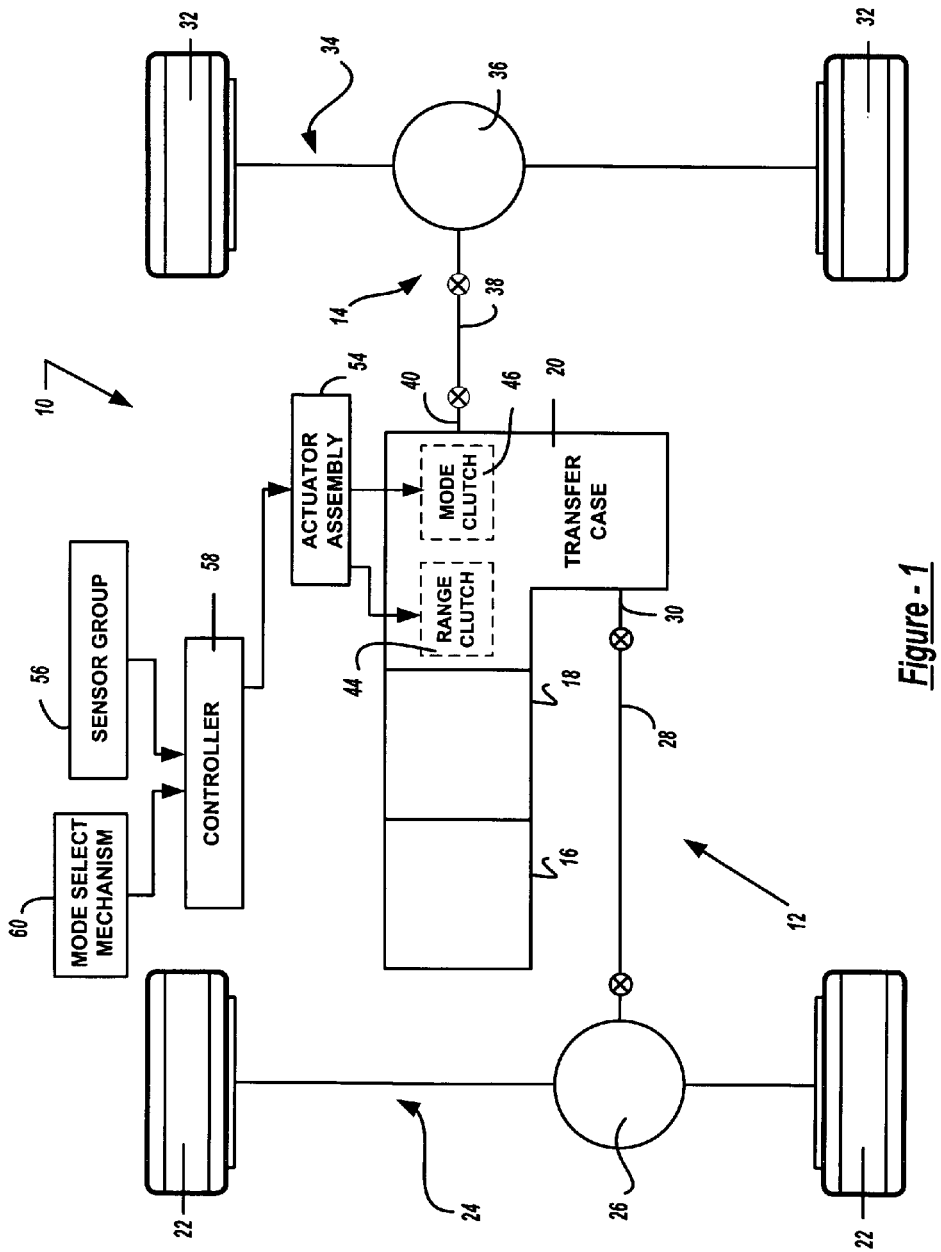
FIG. 1 is a schematic representation of a four-wheel drive motor vehicle equipped with an on-demand power transfer system according to the present invention.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both driveable from a source of power, such as an engine 16, through a transmission 18 which may be of the manual or automatic type. In the particular embodiment shown, the drivetrain includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be detailed hereinafter with greater specificity, transfer case 20 is equipped with a planetary gearset 42, a range clutch 44, and a mode clutch 46. Range clutch 44 is operable to couple components of planetary gearset 42 for driving a carrier assembly 52 at either of a first (high-range) speed ratios or a second (low-range) speed ratio. In addition, carrier assembly 52 is coupled to rear output shaft 40 of transfer case 20. Mode clutch 48 is operable to control the magnitude of speed differentiation and torque transfer between rear output shaft 40 and front output shaft 30. Power transfer system 10 further includes a power-operated actuator assembly 54 for controlling actuation of range shift mechanism 44 and mode clutch assembly 46, a sensor group 56 for sensing dynamic and operational characteristics of the motor vehicle and generating sensor input signals indicative thereof, and a controller 58 for generating control signals in response to the sensor input signals. Power transfer system 10 also includes a mode select mechanism 60 for permitting the vehicle operator to select one of the available drive modes. In particular, controller 58 functions to control actuation of power-operated actuator assembly 54 in response to the mode signal sent to controller 58 from mode select mechanism 60 that is indicative to the particular mode selected.

Figure 2:
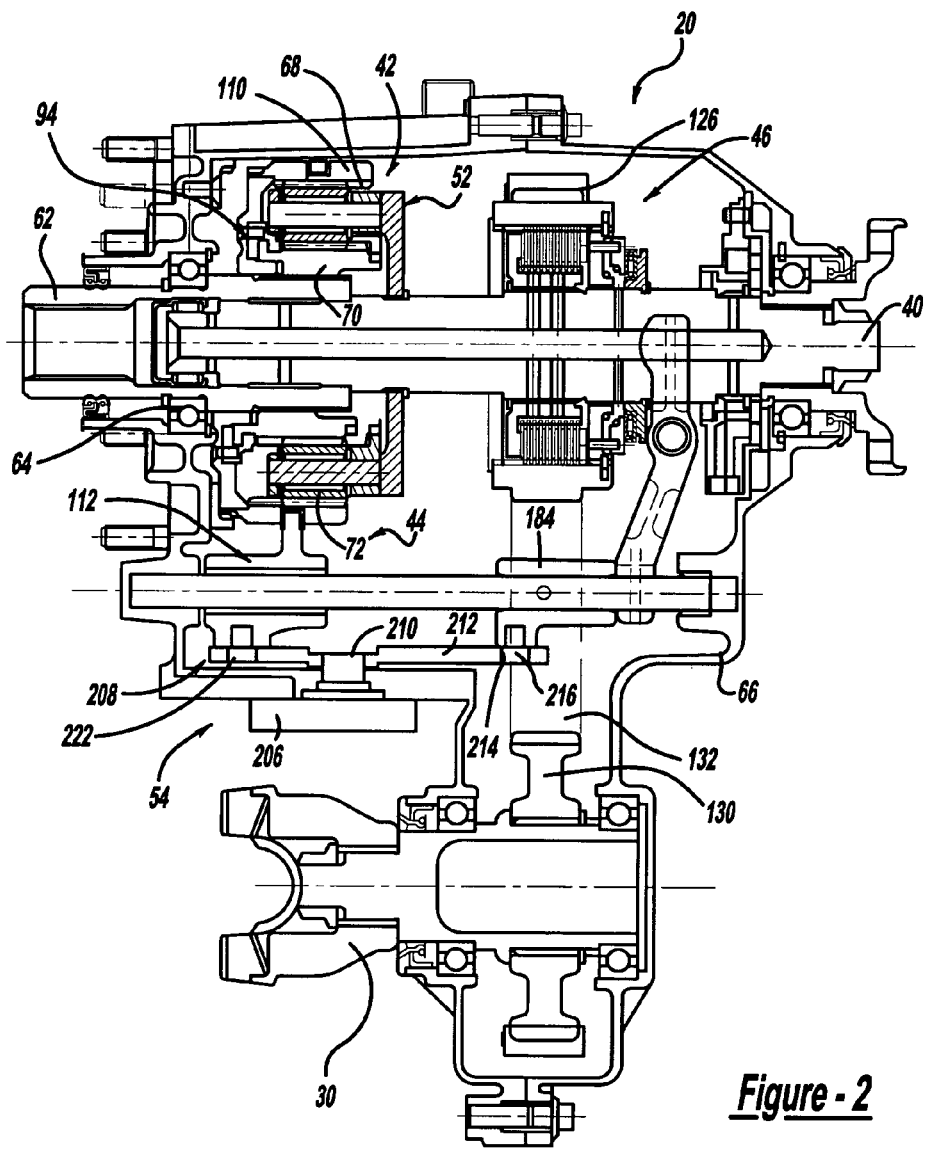
FIG. 2 is a sectional view of an on-demand two-speed transfer case constructed according to a preferred embodiment of the present invention.
Figure 3:
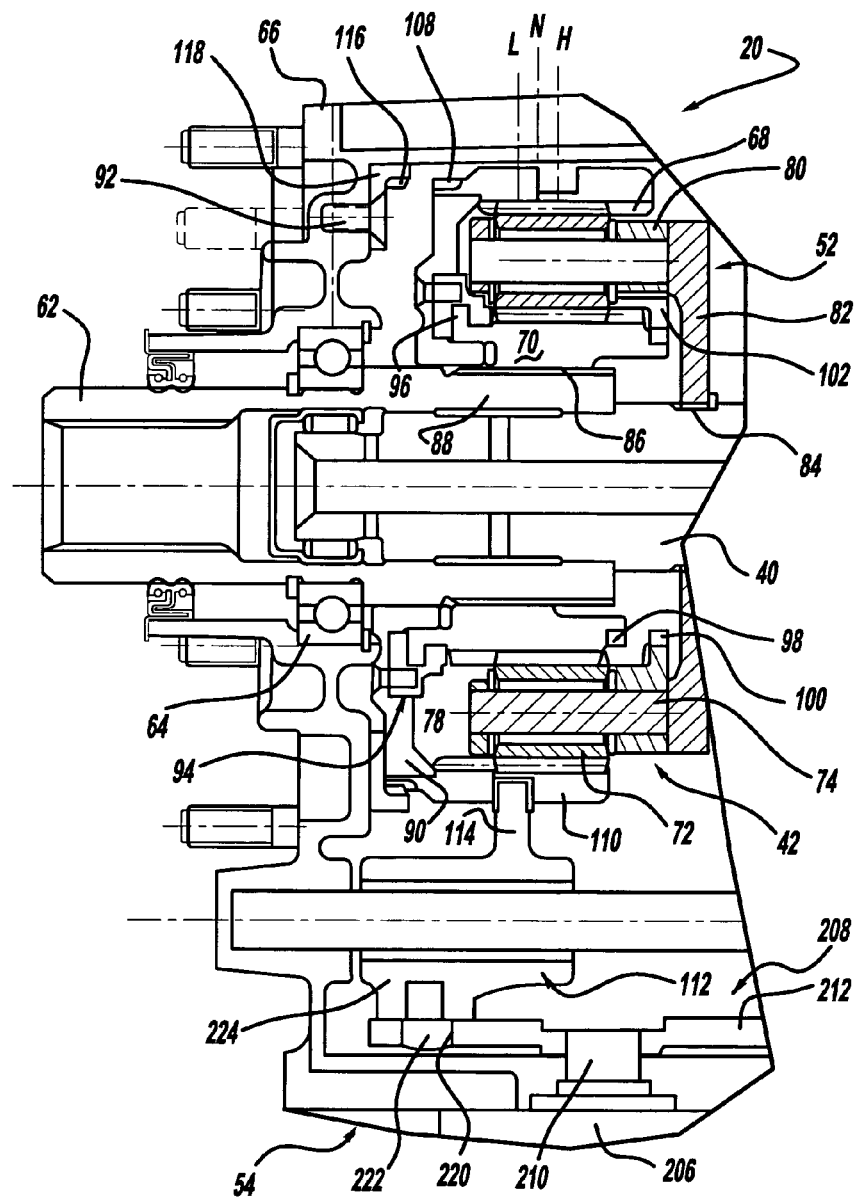
FIG. 3 is an enlarged partial view taken from FIG. 2 showing components of the planetary gear assembly and the range shift mechanism in greater detail.
Figure 4:
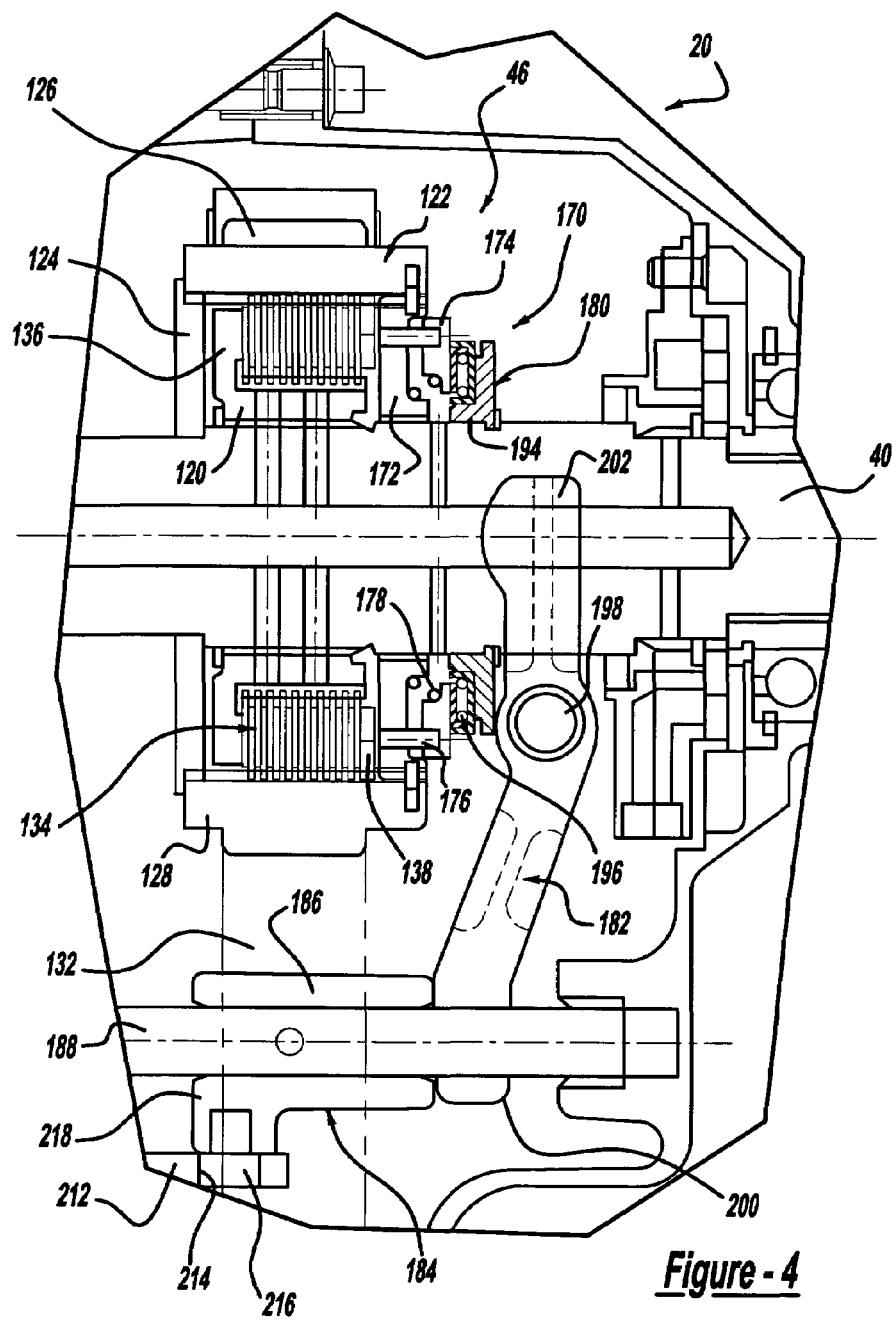
FIG. 4 is an enlarged partial view taken from FIG. 2 showing the components of the mode clutch assembly in greater detail.

With particular reference now to FIG. 2 through 4 of the drawings, transfer case 20 is shown to include an input shaft 62 rotatably supported by a bearing assembly 64 from a housing 66. Input shaft 62 is adapted for connection to an output shaft of transmission 18. Likewise, front output shaft 30 and rear output shaft 40 are also rotatably supported by housing 66. Planetary gearset 48 includes a ring gear 68, a sun gear 70, and a set of first planet gears 72 each meshed with ring gear 68 and first sun gear 70. Planet gears 72 are rotatably supported on pins 74 which extend between first and second carrier rings 78 and 80, respectively, of carrier assembly 52. A drive plate 82 is fixed to second carrier ring 80 and is coupled via a splined connection 84 to rear output shaft 40. Sun gear 70 is shown fixed via a splined connection 86 for rotation with and axial sliding movement on a quill shaft segment 88 of input shaft 62.

Ring gear 68 includes a radial plate segment 90 that is fixed via bolts 92 to a coupling ring 94. Coupling ring 94 includes a circumferential groove within which a radial lug segment 96 of sun gear 70 is retained. Coupling ring 94 permits sun gear 70 to rotate freely relative to ring gear 68 while also enabling concurrent axial movement of ring gear 68 and sun gear 70 relative to carrier assembly 52 between a first position (denoted by position line "H"), a second position (denoted by position line "L"), and a central or third position (denoted by position line "N"). When ring gear 68 and sun gear 70 are located in the H position, as shown in the upper-half of FIG. 3, external clutch teeth 98 on sun gear 70 are engaged with internal clutch teeth 100 on a clutch plate segment 102 of second carrier ring 80. As such, sun gear 70 couples carrier assembly 52 for common rotation with input shaft 62, thereby establishing a direct drive ratio between input shaft 62 and rear output shaft 40. In contrast, sun gear clutch teeth 98 are released from engagement with clutch teeth 100 on second carrier ring 80 when ring gear 68 and sun gear 70 are located in the L position, as shown in the lower-half of FIG. 3, thereby allowing carrier assembly 52 to rotate at a slower speed than input shaft 62 to define a reduced ratio drive connection between input shaft 62 and rear output shaft 40.

Range shift mechanism 44 is shown to include a range sleeve 110 that is fixed to or formed integrally with ring gear 68. Thus, range sleeve 110 is also moveable between the high-range ("H") position, the low-range ("L") position, and the neutral ("N") position. In addition, a first range fork 112 is provided which moves under the control of actuator assembly 54 to control axial movement of range sleeve 110 between its three range positions. First range fork 112 has a fork segment 114 retained in a groove formed in range sleeve 110. As will be detailed, actuator assembly 54 includes a drive mechanism which functions to move range fork 112 so as to cause axial movement of range sleeve 110 for establishing the different drive connections between input shaft 62 and carrier assembly 52.

The direct or high-range drive connection is established between input shaft 62 and rear output shaft 40 when range sleeve 110 is in its H position. With range sleeve 110 in its H position, ring gear 68 and sun gear 70 are located such that external clutch teeth 98 on first sun gear 70 engage internal clutch teeth 100 on second carrier ring 80. Thus, ring gear 68, sun gear 70 and carrier assembly 52 are all commonly driven by input shaft 62. This establishes a direct speed ratio drive connection between input shaft 62 and carrier assembly 52 such that first planet gears 72 are unloaded during operation of transfer case 20 in the high-range modes. This is a significant advantage over conventional two-speed planetary units since it eliminates concerns about fretting corrosion of the teeth on first planet gears 72 and permits use of quieter and smaller helical gears instead of conventional spur gears.

The reduced or low-range drive connection is established between input shaft 62 and rear output shaft 40 when range sleeve 110 is in its L position. With range sleeve 110 in its L position, its clutch teeth 108 are engaged with clutch teeth 116 formed on a clutch plate 118 that is fixed to housing 66 such that ring gear 68 is braked against rotation. In addition, this movement causes sun gear 70 to slide axially to a position whereat its clutch teeth 98 are disengaged from clutch teeth 100 on second carrier ring 80. As such, driven rotation of input shaft 62 drives sun gear 70 via quill shaft 86 such that carrier assembly 52 is rotatively driven at a reduced speed due to ring gear 68 being braked. Finally, a neutral (non-driven) mode is established when range sleeve 110 is in its N position. With range sleeve 110 in its N position, sun gear 70 is released from carrier assembly 52 and ring gear 68 is released from housing 66 such that no drive torque is delivered from input shaft 62 to rear output shaft 40 through carrier assembly 52.

As best seen from FIG. 4, mode clutch assembly 46 is arranged to control slip and torque transfer between rear output shaft 40 and front output shaft 30. Mode clutch assembly 46 is a multi-plate friction clutch assembly which includes a clutch hub 120 that is fixed to rear output shaft 40, a clutch drum 122, and a clutch pack 134 disposed therebetween. Clutch drum 122 has a plate segment 124 that is journalled on output shaft 40 and a drive sprocket 126 formed on its outer rim segment 128. Drive sprocket 126 drives a driven sprocket 130 that is fixed to front output shaft 30 via a power chain 132.

Clutch pack 134 includes a set of inner friction plates splined to clutch hub 120 and which are interleaved with a set of outer friction plates splined to drum 122. Clutch pack 134 is located between a reaction plate 136 formed integrally with clutch hub 120 and an apply plate 138 that is splined to drum 122. As will be detailed, movement of apply plate 138 relative to clutch pack 134 functions to vary the compressive engagement force exerted thereon for adaptively regulating the torque transferred from rear output shaft 40 to front output shaft 30.

Mode clutch 46 further includes a clutch actuation mechanism 170 for moving apply plate 138 under the control of actuation assembly 54. Mechanism 170 includes a locator plate 172 that is splined for rotation with clutch drum 122, a pressure plate 174, and a set of thrust pins 176 having one end A fixed to pressure plate 174 and which extend through apertures in locator plate 172. The second end of thrust pins 176 are adapted to engage apply plate 138. A return spring 178 urges pressure plate 174 in a direction away from locator plate 172 for normally retracting thrust pins 176 from engagement with apply plate 138. However, axial movement of pressure plate 174 between a fully-retracted position and a fully-extended position causes thrust pins 176 to exert a clutch engagement force on apply plate 138 that varies between predetermined minimum and maximum values.

To provide means for moving pressure plate 174 between its fully retracted and fully extended positions, clutch actuation mechanism 170 includes a thrust assembly 180, a lever arm 182, and a mode fork 184. Mode fork 184 has a tubular segment 186 fixed to a shift rail 188, the opposite ends of which are supported in sockets formed in housing 66. Thrust assembly 180 includes a thrust ring 194 and a thrust bearing assembly 196 that is disposed between thrust ring 194 and pressure plate 174. In addition, lever arm 182 is mounted to a pivot post 198 for pivotal movement relative to thrust assembly 180. Lever arm 182 includes a first end portion 200 that is journalled on shift rail 188 and which engages one end of mode fork 184. The opposite end portion 202 of lever arm 182 is a C-shaped biforcated section partially surrounding rear output shaft 40 and which engages thrust ring 194. In operation, axial movement of mode fork 184 causes corresponding pivotal movement of lever arm 182 which, in turn, controls movement of thrust assembly 180 and pressure plate 174.

Preferably, actuator assembly 54 includes a rotary actuator, such as an electric gearmotor 206, which is operable for generating an output torque, the value of which varies as a function of the magnitude of the electrical control signal applied thereto by controller 58. To provide means for selectively controlling the magnitude of the clutch engagement force exerted on clutch pack 134 and movement of range fork 112, actuator assembly 54 further includes a drive mechanism 208. Drive mechanism 208 is interconnected to a rotary output member 210 of gearmotor 206 for changing its output torque into an axially-directed forces that are used for controlling axial movement of range fork 112 and mode fork 184. According to a preferred construction, drive mechanism 208 includes a sector plate 212 that is rotatably driven through a range of angular motion by output member 210 of gearmotor 206.

To generate axial movement of mode fork 184, sector plate 212 includes a mode slot 214 within which a mode pin 216 is retained. Mode pin 216 is fixed to a flange section 218 of mode fork 184. The contour of mode slot 214 is configured to cause the desired direction and amount of axial movement of mode fork 184 in response to rotation of sector plate 212 for generating the desired clutch engagement force exerted by actuation mechanism 170 on clutch pack 134. To control axial movement of range sleeve 110, sector plate 212 also has a range slot 220 within which a range pin 222 extends. Range pin 222 is fixed to a tubular segment 224 of range fork 112 which is shown supported for sliding movement on shift rail 188. The contour of range slot 220 is configured to cause controlled axial movement of range sleeve 110 in response to controlled rotation of sector plate 212.

According to a preferred embodiment of the present invention, sector plate 212 may be rotated to any one of five distinct sector positions to establish a number of different drive modes. These modes may include a locked four-wheel high-range drive mode, an on-demand four-wheel high-range drive mode, a neutral mode, an on-demand four-wheel low-range drive mode, and a locked four-wheel low-range drive mode. The particular four-wheel drive mode selected is established by the position of mode pin 216 in mode slot 214 and the position of range pin 222 in range slot 220. In operation, the vehicle operator selects a desired drive mode via actuation of mode select mechanism 60 which, in turn, sends a mode signal to controller 58 that is indicative of the selection. Thereafter, controller 58 generates an electric control signal that is applied to gearmotor 206 for controlling the rotated position of sector plate 212. More particularly, upon selection of the locked four-wheel high-range drive mode, the neutral mode, or the locked four-wheel low-range drive mode, sector plate 212 is controllably rotated to a predefined sector position associated with each mode. However, when either of the on-demand four-wheel high-range or low-range drive modes are selected, power transfer system 10 is operable for modulating the clutch engagement force applied to clutch pack 134 of mode clutch 46 as a function of the various sensor input signals.

Mode select mechanism 60 can take the form of any mode selector device which is under the control of the vehicle operator for generating a mode signal indicative of the specific mode selected. In one form, the mode selector device may be in an array of dash-mounted push button switches. Alternatively, the mode selector may be a manually-operable shift lever sequentially moveable between a plurality of positions corresponding to the available operational modes which, in conjunction with a suitable electrical switch arrangement, generates a mode signal indicating the selected mode. In either form, mode select mechanism 60 offers the vehicle operator the option of deliberately choosing between the various operative drive modes.

When the locked four-wheel high-range drive mode is selected, sector plate 212 is rotated to a first sector position causing range sleeve 110 to move to its H position and mode fork 184 to move to a position whereat pressure plate 174 is in its fully extended position. As such, the maximum clutch engagement force is exerted on clutch pack 134 and mode clutch 46 is considered to be operating in a fully actuated (locked-up) condition. Thus, speed differentiation between rear output shaft 40 and front output shaft 30 is prevented. Power transfer system 10 may also include a brake which is an electrically controlled device. The brake is engaged once sector plate 212 is rotated to its sector position corresponding to the locked four-wheel high-range drive mode for locking sector plate 212 against further rotation.

If mode select mechanism 60 thereafter signals selection of the on-demand four-wheel high-range drive mode, gearmotor 206 is actuated for initially rotating sector plate 212 to a second sector position which causes mode fork 184 to move to a position whereat pressure plate 174 is in its fully retracted position while range sleeve 110 is maintained in its H position. As such, the minimum clutch engagement force is exerted on clutch pack 134 such that mode clutch assembly 46 is considered to be in a non-actuated condition. Thereafter, mode clutch 46 provides adaptive control of the torque transferred across clutch pack 134. Specifically, the actuated state of gearmotor 206 is continuously monitored and modulated in accordance with specific predefined relationships based on the current value of the sensor input signals. As is apparent, the magnitude of the clutch engagement force is varied by bi-directional rotation of sector plate 212 between its first and second sector positions.

Power transfer system 10 also permits transfer case 20 to be shifted into the neutral mode upon mode selection mechanism 60 signaling selection thereof. Controller 58 commands gearmotor 206 to rotate sector plate to a third sector position. In this sector position, the contour of first range slot 220 has caused range sleeve 110 to move to its N position. Likewise, mode slot 214 has caused mode fork 184 to move to a position whereat mode clutch 46 is non-actuated.

If an on-demand four-wheel low-range drive mode is made available, its selection would cause gearmotor 206 to rotate sector plate 212 to a fourth sector position whereat range sleeve 110 is in its L position and mode clutch 46 is non-actuated. Again, the contour of the range slot and the mode slot control the coordinated movement of range fork 112 and mode fork 184 to establish the desired mode. Preferably, automatic clutch control in the on-demand low-range drive mode is similar to that described the on-demand four-wheel high-range drive mode. To accomplish this adaptive clutch control, sector plate 212 must be moveable from its fourth sector position to a fifth sector position where a maximum engagement force is applied to clutch pack 134. As before, such rotation of sector plate 212 occurs while range sleeve 110 is maintained in its L position. Automatic control of mode clutch 46 is then accomplished in the on-demand four-wheel low-range drive mode to bias torque and limit slip automatically. Finally, selection of the locked four-wheel low-range drive mode signals controller 58 to rotate sector plate 212 to its corresponding fifth sector position. In this sector position, range sleeve 110 is in its L position and mode fork 184 is in the position where pressure plate 174 is in its fully extended position such that mode clutch assembly 46 is locked-up. As before, the brake can be applied to hold sector plate 212 in this position so as to allow gearmotor 206 to be turned-off, thereby decreasing its on-time service.

Planetary gearset 42 is arranged to provide a ratio of between 2:1 to 5:1 for its low-range. For example, planetary gearset 42 establishes a ratio of about 2.6:1 when sun gear 70 has 55 teeth, ring gear 68 has 89 teeth, and first planet gears 72 each have 17 teeth. Alternately, planetary gearset 42 can have a sun gear 70 with 31 teeth while ring gear 68 has 89 teeth and first planet gears 72 each have 29 teeth for defining a 3.9:1 low-range ratio.

Figure 5:
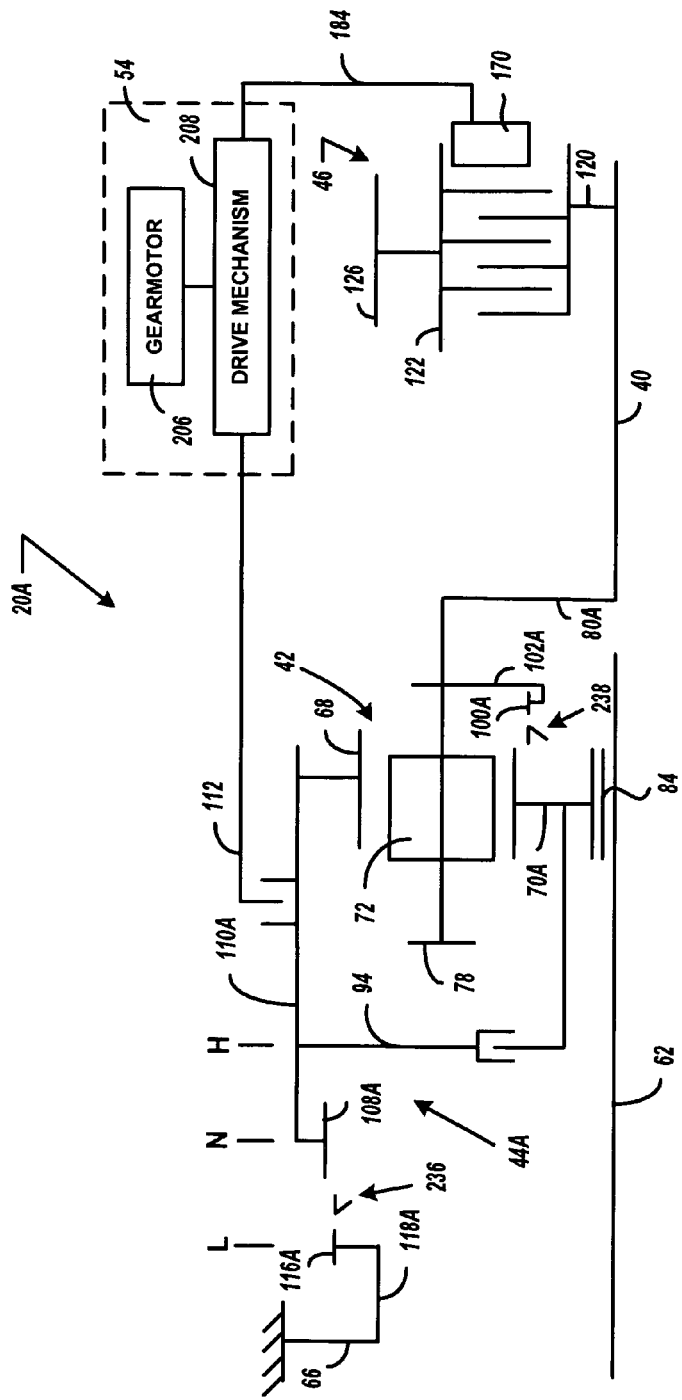
FIG. 5 is a schematic view of an on-demand two-speed transfer case constructed according to an alternative preferred embodiment of the present invention.

Referring now to FIG. 5, a transfer case 20A is schematically shown to be a modified version of transfer case 20 such that common reference numerals are again used to identify similar components. Basically, transfer case 20A has a "synchronized" range clutch 44A that incorporates a pair of synchronizer assemblies 236 and 238 to provide synchronized "on-the-move" high-range and low-range shifts. Specifically, synchronizer assembly 236 is disposed between brake plate 118A and range sleeve 110A for synchronizing the speed of ring gear 68 relative to housing 66 before clutch teeth 108A on range sleeve 110 engage clutch teeth 116A on brake plate 118A. This arrangement allows on-the-move shifting from the high-range drive modes into the low-range drive modes. In addition, second synchronizer assembly 238 is disposed between sun gear 70A and clutch plate segment 102A of second carrier ring 80A for synchronizing the speed of carrier assembly 52A relative to first sun gear 70A before clutch teeth 98A on first sun gear 70A can engage clutch teeth 100A on carrier ring 80A. This arrangement allows on-the-move shifting from the low-range drive modes into the high-range drive modes.

Figure 6:
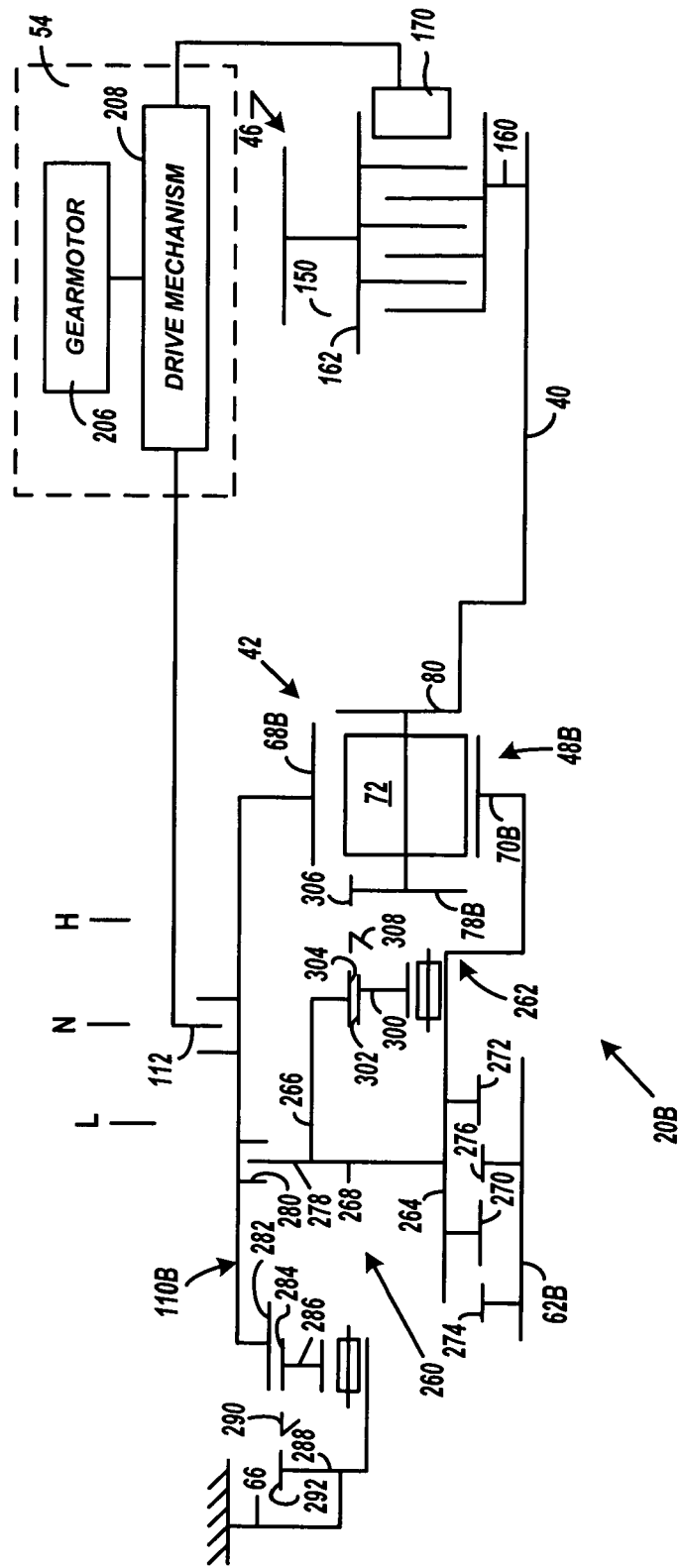
FIG. 6 is a schematic view of another alternative preferred embodiment of a two-speed on-demand transfer case according to the present invention.

Referring now to FIG. 6, a transfer case 20B is schematically shown to be a modified version of transfer case 20 such that common reference numerals are again used to identify similar components. Basically, transfer case 20B has a modified synchronized range clutch 44B. Specifically, planetary gear assembly 42 includes a sun gear 70B, a ring gear 68B and first planet gears 72 rotatably supported between carrier rings 78B and 80B. Sun gear 70B is shown to have a coupling ring 262 fixed thereto which includes an inner cylindrical rim segment 264 and an outer cylindrical rim segment 266 interconnected by a plate segment 268. Inner rim segment 264 has a set of first internal spline teeth 270 which are axially offset from a set of second internal spline teeth 272. Also, input shaft 62B is shown to include a first set of external spline teeth 274 and a second set of external spline teeth 276. A radial lug 278 extending outwardly from outer ring segment 266 is retained in a circumferential groove 280 formed in range sleeve 110B. Ring gear 68B is shown to be fixed to one end of range sleeve 110B such that it and sun gear 70B are axially moveable with range sleeve 110B.

Range sleeve 110B is axially moveable between three distinct range positions (L, N, H) via movement of range fork 112 upon controlled actuation of actuator assembly 54. Range sleeve 110B includes internal clutch teeth 282 which are in constant mesh with external teeth 284 formed on a hub 286. Hub 286 is rotatably supported on a clutch plate 288 that is fixed to housing 66. A synchronizer assembly 290 is disposed between hub 286 and clutch plate 288 and functions to establish speed synchronization therebetween prior to permitting clutch teeth 282 on range sleeve 110B to enter into engagement with clutch teeth 292 on low clutch plate 288 during movement of range sleeve 110B toward its L position. When an available low-range drive mode is selected, gearmotor 206 rotates sector plate 212 of drive mechanism 208 for causing range fork 112 to move range sleeve 110B to its L position. Such movement of range sleeve 110B causes both sets of clutch teeth 270 and 272 on coupling ring 262 to meshingly engage corresponding sets of clutch teeth 274 and 276 on input shaft 62B while also causing its clutch teeth 282 to engage clutch teeth 292 on clutch plate 288. Thus, sun gear 70B is driven by input shaft 62B and ring gear 68B is braked by housing 66 against rotation such that carrier assembly 52 and rear output shaft 40 are driven at a reduced speed. Planetary gearset 42 can be arranged to provide any suitable reduction ratio including, without limitation, either of the 2.6:1 or 3.9:1 ratio previously disclosed.

With continued reference to FIG. 6, synchronized range clutch 44B is further shown to include a clutch hub 300 that is rotatably supported on coupling ring 262 and which has external spline teeth 302 in constant mesh with internal clutch teeth 304 formed in outer ring segment 266 of coupling ring 262. First carrier ring 78B is shown to include clutch teeth 306 that are aligned to receive clutch teeth 304 of coupling ring 262 upon movement of range sleeve 110B to its H position. A synchronizer assembly 308 is disposed between hub 300 and carrier ring 78B and functions to establish speed synchronization between carrier assembly 52 and sun gear 70B prior to engagement of coupling ring teeth 304 with carrier ring teeth 306. When it is desired to establish an available high-range drive mode, range sleeve 110B is moved toward its H position where teeth 270 on coupling ring 262 engage teeth 276 on input shaft 62B such that sun gear 70B is driven by input shaft 62B. Also, upon synchronization, clutch teeth 304 on coupling ring 262 engages clutch teeth 306 on first carrier ring 78B such that a direct drive connection between input shaft 62B and carrier assembly 52 is established. Range sleeve 110B is shown in its N position with coupling ring 262 disengaged from input shaft 62B.

The foregoing discussion discloses and describes various preferred embodiments of the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case comprising:
    an input shaft;
    an output shaft;
    a planetary gear assembly interconnecting said input shaft to said output shaft and including a sun gear splined to said input shaft, a ring gear, and a set of planet gears supported by a carrier assembly and meshed with said sun gear and said ring gear, said carrier assembly is fixed to said output shaft;
    a coupling ring interconnecting said ring gear to said sun gear to facilitate relative rotation therebetween and axial movement of said sun gear on said input shaft in response to axial movement of said ring gear;
    a range clutch including a first clutch plate fixed to said carrier assembly, a second clutch plate fixed to a stationary member, and a range sleeve fixed to said ring gear and axially moveable between a high-range position and a low-range position to establish corresponding high-range and low-range drive connections between said input shaft and said output shaft, said range sleeve is operable in its high-range position to couple said sun gear to said first clutch plate and release said ring gear from coupled engagement with said second clutch plate, and said range sleeve is operable in its low-range position to release said sun gear from couple engagement with said first clutch plate and couple said ring gear to said second clutch plate; and
    a shift mechanism for moving said range sleeve between its high-range and low-range positions.

2. The transfer case of claim 1 wherein said range clutch further includes a first synchronizer operably disposed between said sun gear and said carrier assembly and a second synchronizer operably disposed between said second clutch plate and said ring gear.

3. The transfer case of claim 1 further comprising a quill shaft formed on said input shaft to which said sun gear is splined, said sun gear is adapted to slide axially relative to said quill shaft while being continuously driven by said input shaft.

4. The transfer case of claim 1 wherein said ring gear includes a plate segment, and wherein said coupling ring is fixed to said plate segment of said ring gear and has a circumferential groove within which a radial lug segment of said first sun gear is retained.

5. The transfer case of claim 1 wherein said shift mechanism includes a range fork operable for moving said range sleeve between its high-range and low-range positions, and an actuator assembly for moving said range fork.

6. The transfer case of claim 5 wherein said actuator assembly includes a sector plate and a power-operated actuator for rotating said sector plate, and wherein said range fork engages said sector plate such that rotation of said sector plate causes movement of said range fork.

7. The transfer case of claim 1 further including a second output shaft, and a mode clutch operably disposed between said first and second output shafts which is normally operable to permit speed differentiation therebetween, said mode clutch is further operable for limiting excessive speed differentiation between said output shafts.

8. The transfer case of claim 7 wherein said mode clutch is a multi-plate clutch assembly having a set of first clutch plates fixed for rotation with said first output shaft and which are interleaved with a set of second clutch plates fixed for rotation with said second output shaft, and means for transferring drive torque from the faster rotating clutch plates to the slower rotating clutch plates in response to said speed differential exceeding a predefined value.

9. The transfer case of claim 8 wherein said mode clutch includes a thrust mechanism for exerting a clutch engagement force on said interleaved clutch plates, and an actuator assembly for generating said clutch engagement force.

10. The transfer case of claim 1 wherein said range clutch further comprises a first synchronizer assembly disposed between said first clutch plate and said first sun gear, and a second synchronizer assembly disposed between said second clutch plate and said range sleeve.

11. The transfer case of claim 10 wherein said first sun gear has clutch teeth adapted to engage clutch teeth formed on a carrier ring associated with said carrier assembly with said first synchronizer assembly operably disposed between said first sun gear and said carrier ring.

12. A transfer case comprising:
    an input shaft;
    first and second output shafts;
    a planetary gearset interconnecting said input shaft to said first output shaft and including a sun gear driven by said input shaft, a ring gear, and a set of planet gears supported by a carrier assembly and meshed with said sun gear and said ring gear, said carrier assembly driving said first output shaft, said ring gear is interconnected to said sun gear to permit concurrent movement thereof between a first position and a second position while allowing relative rotation therebetween, said sun gear is permitted to rotate relative to said carrier assembly when located in its second position and said sun gear is coupled to said carrier assembly when located in its first position;
    a first clutch plate driven by said carrier assembly;
    a second clutch plate fixed to a stationary member; and
    a shift mechanism for moving said ring gear between its first and second positions to establish high-range and low-range drive connections between said input shaft and said carrier assembly, said high-range connection is established when said ring gear is in its first position whereat said sun gear is coupled to said second clutch plate and said ring gear is released from said first clutch plate, and said low-range drive connection is established when said ring gear is in its second position whereat said ring gear is coupled to said first clutch plate and said sun gear is released from said first clutch plate.

13. The transfer case of claim 12 further includes a first synchronizer operably disposed between said first clutch plate and said sun gear for inhibiting movement of said ring gear to its first position until speed synchronization is established, and a second synchronizer operably disposed between said second clutch plate and said ring gear for inhibiting movement of said ring gear to its second position until speed synchronization is established therebetween.

14. The transfer case of claim 12 further comprising a quill shaft formed on said input shaft to which said sun gear is splined, said sun gear is adapted to slide axially relative to said quill shaft between its first and second positions while being continuously driven by said input shaft.

15. The transfer case of claim 12 wherein a coupling ring fixed to said ring gear causes sliding movement of said sun gear in response to concurrent movement of said ring gear.

16. The transfer case of claim 15 wherein said ring gear includes a plate segment, and wherein said coupling ring is fixed to said plate segment of said ring gear and has a circumferential groove within which a radial lug segment of said sun gear is retained.

17. The transfer case of claim 12 wherein said shift mechanism includes a range fork operable for moving said range sleeve between its high-range and low-range positions, and an actuator assembly for moving said range fork.

18. The transfer case of claim 17 wherein said actuator assembly includes a sector plate and a power-operated actuator for rotating said sector plate, and wherein said range fork engages said sector plate such that rotation of said sector plate causes movement of said range fork.

19. The transfer case of claim 12 further including a mode clutch operably disposed between said first and second output shafts and which is normally operable to permit speed differentiation between said output shafts, said mode clutch is further operable for limiting excessive speed differentiation between said output shafts.

20. The transfer case of claim 19 wherein said mode clutch is a multi-plate clutch assembly having a set of first clutch plates fixed for rotation with said first output shaft and which are interleaved with a set of second clutch plates fixed for rotation with said second output shaft, and means for transferring drive torque from said first output shaft to said second output shaft in response to said speed differential exceeding a predefined value.

21. A transfer case comprising:

an input shaft;

first and second output shafts;

a planetary gearset including a sun gear, a ring gear, and a set of planet gears rotatably supported from a carrier that is coupled to said first output shaft;

a coupling ring driven by said input shaft and driving said sun gear;

a first clutch plate fixed to said carrier;

a second clutch plate fixed to a stationary member;

a range sleeve fixed to said ring gear and moveable between a first position and a second position, said coupling ring interconnected to said range sleeve for movement therewith, said range sleeve is operable in its first position to couple said coupling ring to said first clutch plate and be released from coupled engagement with said second clutch plate, and said range sleeve is operable in its second position to be coupled to said second clutch plate and release said coupling ring from engagement with said first clutch plate; and a shaft mechanism for moving said range sleeve between its first and second positions.

22. The transfer case of claim 21 wherein said coupling ring is splined for rotation with and axial movement on said input shaft in response to movement of said range sleeve.

23. The transfer case of claim 21 wherein said coupling ring includes clutch teeth adapted to engage clutch teeth on said first clutch plate when said range sleeve is moved to its first position.

24. The transfer case of claim 23 further comprising a synchronizer disposed between said coupling ring and said first clutch plate.

25. The transfer case of claim 21 wherein said range sleeve includes clutch teeth adapted to engage clutch teeth on said second clutch plate in response to movement to its second position.

26. The transfer case of claim 25 further comprising a synchronizer disposed between said range sleeve and said second clutch plate.

* * * * *